March 11, 1952 — C. I. LONGENECKER — 2,589,012
VALVE FOR PLASTIC CONCRETE PRESSURE PUMPS
Filed July 24, 1947 — 3 Sheets-Sheet 1

C. I. LONGENECKER
INVENTOR.
BY George A. Evans
ATTORNEY

March 11, 1952     C. I. LONGENECKER     2,589,012
VALVE FOR PLASTIC CONCRETE PRESSURE PUMPS
Filed July 24, 1947     3 Sheets-Sheet 2
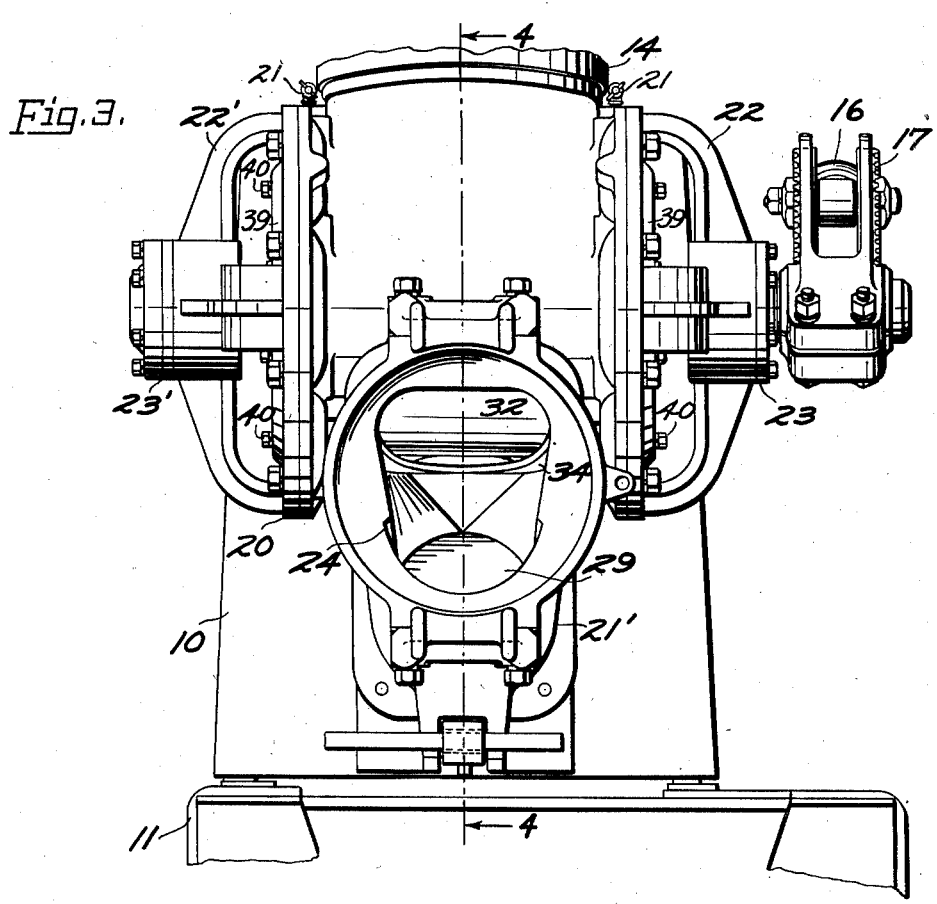
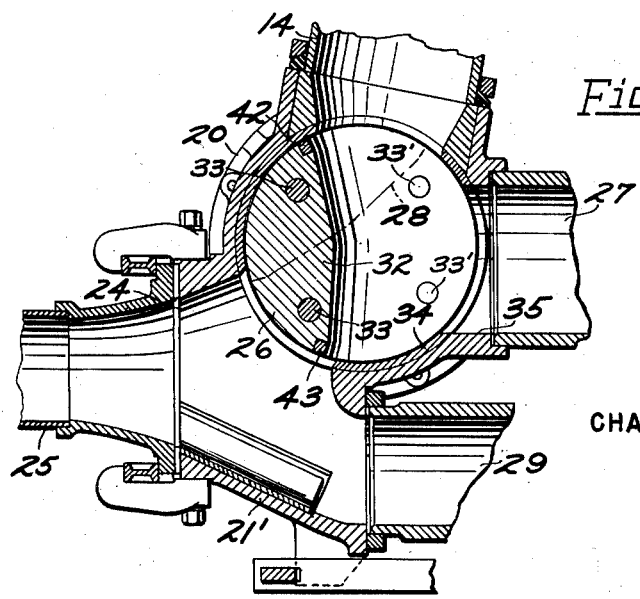
CHARLES I. LONGENECKER
INVENTOR.
BY George A. Evans
ATTORNEY

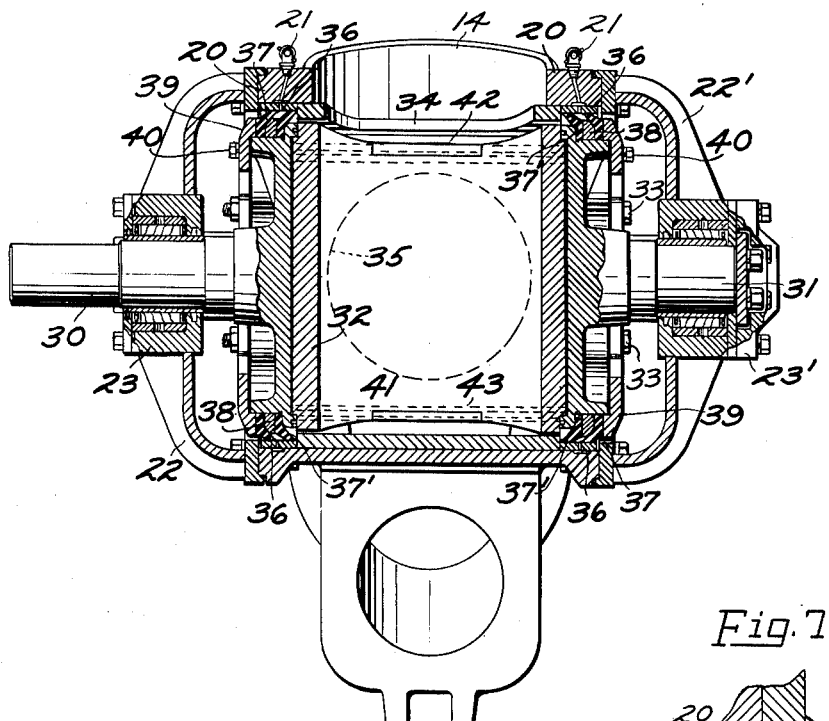
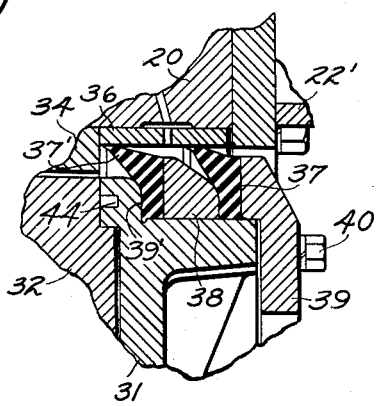
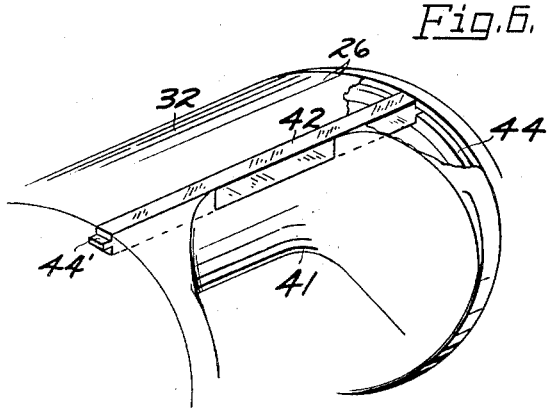

Patented Mar. 11, 1952

2,589,012

UNITED STATES PATENT OFFICE 2,589,012

VALVE FOR PLASTIC CONCRETE PRESSURE PUMPS

Charles I. Longenecker, Wauwatosa, Wis., assignor to Chain Belt Company, Milwaukee, Wis., a corporation of Wisconsin Application July 24, 1947, Serial No. 763,328

7 Claims. (Cl. 251—113)

This invention relates to valves and more especially to those adapted for use with a plastic concrete pressure pump, such as is disclosed and claimed in my copending application, filed December 6, 1945, Serial Number 633,091, now Patent No. 2,448,104, issued August 31, 1948. The machine disclosed in said application is of a single valve, differential-cylinder type; however, the features of this invention can be adapted with equal facility to a double valve, single cylinder type pump, such as shown in prior U. S. Patents Nos. 2,017,974 and 2,017,975, granted October 22, 1935, on applications filed by Otto M. Kastner and Jacobus C. Kooyman, respectively, or a single cylinder, single valve pump such as is shown in my prior U. S. Patent No. 2,384,783.

The valve mechanism of a plastic concrete pressure pump is subject to extreme wear and abrasion of its moving parts and passages when said pump is used to pump grouts, concrete mixtures, etc. Also, in order to secure the proper pressure in the pumping system it is necessary to provide proper sealing means for the valve. Because of the nature of the material pumped such sealing means need must be of a durable design capable of standing up during extended periods of use.

The principal objects of this invention are to improve the valve structure for plastic concrete mixture pressure pumps, the valve passages and sealing means for said valve.

In the drawings:

Fig. 3 is a side view of the valve mechanism shown in Fig. 2;

Fig. 4 is a sectional view of the valve taken along the lines 4—4 of Fig. 3 showing the valve in one of the two positions it may occupy;

Fig. 5 is a sectional view of the valve taken along the lines 5—5 of Fig. 2 further showing the arrangement of the seals, plates and channel;

Fig. 6 is a perspective view, partly broken away of a portion of the valve plug and one of the end plates showing the arrangement of one of the replaceable wear resistant members relative thereto; and Fig. 7 is an enlarged sectional view of the sealing means shown in Fig. 5.

It is not difficult to imagine some of the adverse conditions encountered when a stream of plastic concrete containing stones, sand, and cement under pressure is stopped, and started again at a rate which may be as high as fifty times per minute. The maximum pressure in the pipe line is at the pump, and the disposition of the valves adjacent the piston of the pump subject the valves to the maximum abrasive action and pressure conditions. In the teachings of the above mentioned patents relative to concrete pressure pumps, it is noted that the valve is never actually closed completely so as to utilize the stowing properties of the concrete mixture.

The oscillatory movement of the valve shearing across the mass of concrete in the working chamber of the pump produces great abrasive action on the valve plug. The stowing action likewise produces some abrasive action. Therefore, means are provided in this invention in the form of wear resistant elements positioned at both ends of the passage through the valve to resist the abrasive action of the coursing aggregates. Further, since the correct function of the valve is dependent on the sealing means for said valve, an improved seal is provided which is continuously packed and lubricated when said pump is in operation. The invention further provides a valve which is formed of separate parts any one of which can be replaced at a minimum of expense and effort.

Figure 1:
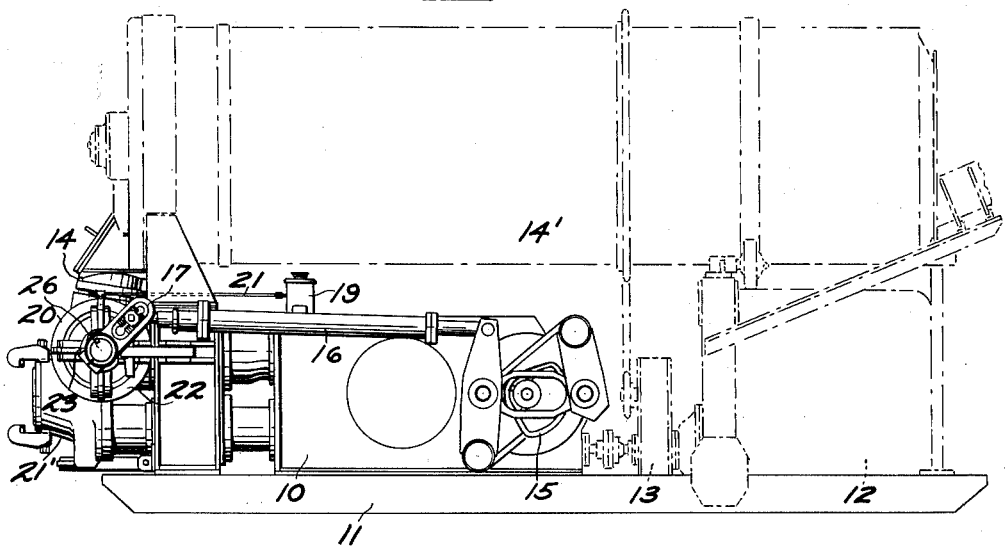
Fig. 1 is a front elevation of a plastic concrete pressure pump.

Referring to the drawings, and in particular to Fig. 1, a concrete pressure pump 10 is shown mounted on a skid base 11. The pump is driven by a gasoline engine 12 shown in dotted lines through gearing 13. The mixed aggregates or grout, as the case may be, are delivered to the pump inlet 14 by the agitator 14', also shown in dotted lines.

Mechanism to effect oscillatory movement of the valve plug comprising a cam 15, valve rod 16 and lever arm 17 are also shown. A more complete disclosure of this mechanism is shown in the application Serial Number 633,091, previously referred to. A force feed lubricating mechanism 19 supplies lubricant to the packing at each end of the valve 20 through tubing 21. In the instant embodiment this device supplies about .5 cc. of lubricant per minute when the pump 10 is in operation.

Figure 2:
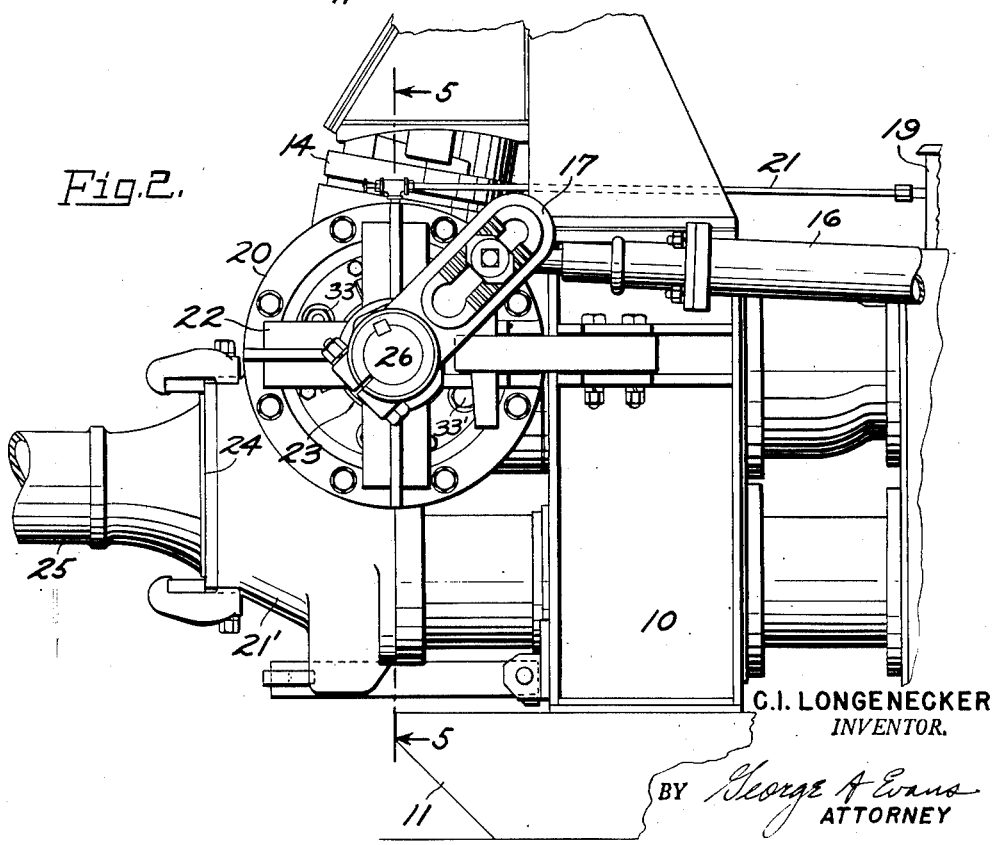
Fig. 2 is an enlarged frontal view of the valve portion of said pump.

Fig. 2 shows the valve 20 in greater detail. The working chamber 21' of the valve is shown here as an integral casting. However, other variations are possible. Spider-like supporting members 22 and 22' are attached to each side of said chamber and provide journals 23 and 23' for the oscillating plug 26, as is also shown in Fig. 3. The outlet for said pressure pump emerges from one end of the chamber as at 24, and has attached to it the adapter and piping 25 used to conduct the material pumped to the site of application.

Fig. 4 is a sectional view of the valve shown in Fig. 3. The plug 26 is shown in a position closing the discharge. While in this position aggregates are drawn in from the agitator 14' through the opening 14 and into the large cylinder 27 where a piston, not shown, is exerting suction. When the valve is moved to the position shown in dotted lines 28, part of the aggregates in the cylinder 27 are pumped out through the outlet opening 24 and the rest are drawn into the small cylinder 29. The action of the piston in the small cylinder 29 is timed to cause its suction stroke to occur during the propulsion stroke of the piston in the larger cylinder, i. e., when the valve is open, while the propulsion stroke of the piston in the smaller cylinder 29 occurs when the valve is closed, thereby discharging the contents of the smaller cylinder into the pipe line 25. The differential action of these pistons relative to the oscillating valve forms the subject matter of copending application Serial Number 633,091.

The details of structure for the valve plug, the liner and the packing are readily comprehended by the combined reference to Figs. 4, 5 and 7. The valve plug 26 is constructed of three basic parts; the journal extensions 30 and 31 and the body portion or plug itself 32. These three elements are bolted together by means of the bolts 33 and cap screws 33'. A centrally disposed liner 34 is placed in the bore of the valve housing; the liner is formed of a wear resistant material and is constructed so that there is a very loose fit between the liner itself and the plug when assembled. As can be realized, the liner is a replaceable element which can be removed after it has been worn by the abrasive action of the aggregates pumped through said valve. There are openings in the liner to correspond to the inlet 14, the entrance 35 to the cylinder 27, and the outlet leading to the lower portion of the valve housing.

Seal wearing rings 36 of chromium plated material are press fitted into the bore of the valve housing at each end of said liner. On the valve plug assembly there are annular packing rings 37 formed of rubber material, or such material having the corresponding properties of rubber. It will be noted by reference to Fig. 5 that said packing rings 37 are spaced apart by an annular member 38 and the sides of the rings 37 are engaged and held against lateral movement by the flange ring 39 and shoulder 39' on the journal extension 30. The construction is such that triangular lip portions of the packing rings are deflected by engagement with the seal wearing rings 36 when assembled. The entire assembly of packing rings and retainer members are drawn up tight by the bolts 40. Lubricant from the force feed lubricator 19 is delivered between the packing rings 37 through the piping 21. As is shown in Fig. 5, this lubricant is passed through the valve housing to a relief in the valve body 20 opposite the central peripheral portions of the ring 36; regularly spaced holes through said ring permit the lubricant to be forced between the seals at uniform intervals on the circumference of the ring. Some of the excess lubricant may possibly escape past the outside edge, however, the remaining excess lubricant enters the space between the plug 32 and the liner 34 and ultimately mingles with the pumped aggregates. This has no deleterious effect on the aggregates pumped.

It will be observed that the inside diameter of the liner 34 is somtwhat less than the inside diameter of the seal wearing rings 36, and hence any material escaping between the end portions of the plug 32 and the liner will force the lip portions of the inner packing rings 37' into closer engagement with the seal wearing ring 36, thus enhancing the sealing of the valve in the operation of the pump. Also, the seal rings are so arranged so that lubricant can escape into the valve chamber providing an annulus of lubricant adjacent the inner seal ring. This annulus of lubricant protects the sealing rings and prevents any grouts, etc., from setting up in their working area.

The passage or channel through the plug 41 is perhaps best shown in the perspective view Fig. 6. As can be appreciated the plug 32 itself is cylindrical and has a cut-out portion on one side forming the channel. As the plug is oscillated, this channel forms a valve segment opening and closing the ports in the valve liner, as heretofore described. The channel in the valve plug has slanting sides, which are curved to meet flat bottom portions which merge near the center of the plug. The flat bottom portions which are at a slight angle to each other are of substantial length axially of the plug, and they extend to the periphery of the plug where they merge with the cylindrical peripheral portion. Wear-resistant members 42 and 43 are set in longitudinal grooves formed in the periphery of the plug at the respective ends of the channel and form the leading edges of the plug as it is oscillated in its chamber. Each member or bar 42 and 43 has at its end a tongue portion 44' engaging an annular groove 44 in the face of the journal extensions 30 and 31. When the leading faces of the bars 42 and 43 become unduly worn by abrasion, they may be taken out; and, since they are square in cross section, they may be rotated 180° and set back in the grooves to perform as effectively as new bars would. The above feature has resulted in a very material saving in operating costs of the concrete pressure pump.

Before this invention it was extremely difficult to form the valve plug assembly, or the plug itself as the case may be, of material which was hard enough to withstand the severe abrasion induced by obstructing the flow of concrete through the valve passageway. This abrasive action eats away the edges of the channel through the plug valve, so that after a relatively short period of time the efficiency of the pump falls off, and the valve must be replaced or rebuilt. In the past it was necessary to replace the entire vave plug, as this was formerly of one piece, or subject it to expensive welding and machining repairs, which required considerable time. Moreover, a valve could only be rebuilt about twice.

With the present invention, it is only necessary to remove the valve and reverse the rods 42. The rods may be of alloy steel, heat treated to a hardness which could not be obtained throughout the plug. When both sides of the rods become worn, the entire rods may be replaced with slight expense and labor, and the pump will continue to operate efficiently. The end portions of the grooves in the plug retain the rods against lateral movement and the grooves 44 in the journal extensions prevent radial as well as axial movement. As these latter parts are not subjected to very much wear, the use of replacement rods is accomplished in a practical manner.

The invention having been described, what is claimed is:

1. In a pump for pumping concrete or the like, an oscillating plug member having cylindrical end portions and a channel transverse to the axis of said plug, said plug having a longitudinal groove in its periphery aligned with an inner end of said channel, a wear-resisting element disposed within said longitudinal groove with the central portion of one of its faces forming an extension of an inner end of said channel, said wear-resistant element forming the leading edge of the plug member when the latter is oscillated through the medium being pumped, and means securing the wear-resistant element within the plug member.

2. In a pump for pumping concrete or the like, an oscillating plug member having cylindrical end portions and a channel transverse to the axis of said plug, said plug having a longitudinal groove substantially square in cross section arranged in its periphery and aligned with an inner end of said channel, a wear-resisting element conforming to the shape of said groove and snugly fitted therein, the central portion of one of the faces of said element forming an extension of the inner end of said channel, and means securing the wear-resistant element within the plug member.

3. In a pump for pumping concrete or the like, an oscillating plug member having cylindrical end portions and a channel transverse to the axis of said plug, said plug having a longitudinal recess in its periphery aligned with an inner end of said channel, a flanged trunnion element arranged at one side of said plug and having a recess in the flange thereof, a wear-resisting element arranged to fit in said longitudinal recess with one of its ends extending into said flange recess, and means securing together the flanged trunnion element and the plug member to retain the wear-resistant element in the aforesaid recesses.

4. In a pump for pumping concrete or the like, an oscillating plug valve having cylindrical end portions and a channel transverse to the axis of said plug, said plug having a longitudinal groove in its periphery aligned with the bottom of said channel, flanged trunnion elements abutting the ends of said plug and having annular grooves in the inner ends thereof, a wear-resisting element arranged to fit in said longitudinal groove with its ends extending into said annular grooves, and means securing together the flanged trunnion element and the plug member with the wear-resistant element contained in said grooves.

5. In a pump for pumping concrete or the like, an oscillating plug member having cylindrical end portions and a channel transverse to the axis of said plug, a trunnion of reduced diameter extending from one end of said plug, an enclosure for the end of said plug providing a bearing to support the same, spaced sealing members mounted on said trunnion having deformable tip portions extending radially beyond the cylindrical portion of said plug, said tip portions being deformed inwardly toward the center of the plug by contact with said enclosure and providing an annular, lubricant-retaining pocket inwardly of each sealing member, and means supplying lubricant through the enclosure to the space behind the tip of the innermost sealing member, whereby the tip portion of the adjacent outer sealing member may be forced against the enclosure to retain the lubricant and the pocket inward of the innermost sealing member may be supplied with lubricant and serve as a reservoir to inhibit the setting of concrete adjacent said sealing member.

6. In a pump for pumping concrete or the like, an oscillating plug valve having cylindrical end portions and a channel transverse to the axis of said plug, a trunnion of reduced diameter extending from one end of said plug, a valve chamber enclosing the end of said plug and providing a bearing to support the same, said enclosure having an annular recess, a ring mounted in said enclosure having a series of circumferentially spaced ports communicating with said annular recess, spaced sealing members mounted on said trunnion having tapered, deformable tip portions extending radially beyond the cylindrical portion of said plug, said tip portions being deformed inwardly toward the center of the plug by contact with said ring and providing an annular, lubricant-retaining pocket inwardly of each sealing member, and means supplying lubricant through the enclosure and the ports in said ring to the space outside the tip of the innermost sealing member, whereby the tip portion of the adjacent outer sealing member may be forced against the ring to retain the lubricant and the pocket inward of the innermost sealing member may be supplied with lubricant and serve as a reservoir to inhibit the setting of concrete adjacent said sealing member.

7. In a pump for pumping concrete or the like, an oscillating plug valve member having cylindrical end portions and a trunnion of reduced diameter extending from one end thereof, a housing having running clearances with the ends of said plug and providing a bearing to support said trunnion, spaced sealing members arranged between the juxtaposed surfaces of said trunnion and said housing disposed inwardly of said bearing, said sealing members having deformable, tip portions extending radially beyond the cylindrical portions of said plug, said tip portions being deformed inwardly toward the center of the plug by contact with one of said surfaces and providing an annular, lubricant-retaining pocket inwardly of each sealing member, and means supplying lubricant to the space outwardly of the tip of the innermost sealing member, whereby the tip portion of the adjacent outer sealing member may be pressed more tightly against the surface it contacts to retain the lubricant and the pocket inward of the innermost sealing member may be supplied with lubricant escaping past the innermost sealing member and serve as a reservoir to inhibit the setting of concrete adjacent said last mentioned sealing member.

CHARLES I. LONGENECKER.

REFERENCES CITED

The following references are of record in the file of this patent:

UNITED STATES PATENTS

| Number | Name | Date |
|---|---|---|
| 1,347,351 | Murray | July 20, 1920 |
| 1,954,018 | Miller | Apr. 10, 1934 |
| 2,084,248 | Ferrari | June 15, 1937 |
| 2,169,526 | Goldberg | Aug. 15, 1939 |
| 2,384,783 | Longenecker | Sept. 11, 1945 |
| 2,433,732 | Brown | Dec. 30, 1947 |

FOREIGN PATENTS

| Number | Country | Date |
|---|---|---|
| 805,137 | France | Nov. 12, 1936 |